United-States Patent Office.

ADOLF ISRAEL AND RICHARD KOTHE, OF ELBERFELD, GERMANY, ASSIGNORS TO FARBENFABRIKEN OF ELBERFELD CO., OF NEW YORK, N. Y.

MIXED GUANIDIN DERIVATIVES AND PROCESS OF MAKING SAME.

SPECIFICATION forming part of Letters Patent No. 677,515, dated July 2, 1901.

Application filed February 20, 1901. Serial No. 48,168. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Mixed Guanidin Derivatives and Processes of Making Same; and we hereby declare the following to be a clear and exact description of our invention.

Our invention relates to the production of new mixed guanidin derivatives having the following general formula:

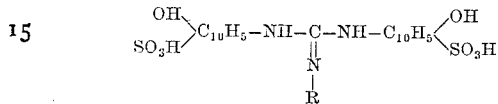

(R meaning in this formula a hydrogen atom which can be substituted by a fatty or an aromatic radical—such as methyl, phenyl, oxynaphthyl, oxynaphthyl sulfonic acid, or the like.)

The process for producing the said guanidin derivatives consists in treating mixed thio-urea compounds with ammonia or with primary fatty or aromatic amins—such as methylamin, anilin, paraphenylenediamin, amidonaphthol, amidonaphthol sulfonic acid, or the like—in the presence of agents capable of absorbing sulfureted hydrogen, such as lead oxid or the like. The said mixed thiourea compounds can be prepared, for instance, by treating with carbon bisulfid, sulfur, and alcohol an equimolecular mixture of two different amidonaphthol sulfonic acids which do not contain the amido and the hydroxy group either in the so-called "ortho" position or in the so-called "peri" position. The new guanidin derivatives thus obtained are in the shape of the sodium salts grayish powders readily soluble in hot and soluble in cold water and being soluble with difficulty in dilute mineral acids. They can be combined with diazo compounds, valuable azo dyestuffs being thus produced.

In carrying out our new process practically we can proceed as follows, the parts being by weight: 56.5 parts of the sodium salt of thiocarbonyl-dioxydinaphthylamin disulfonic acid (obtained from an equimolecular mixture of beta$_1$-amido-alpha$_3$-naphthol-beta$_4$-sulfonic acid and beta$_1$-amido-alpha$_4$-naphthol-beta$_3$-sulfonic acid) having the following formula:

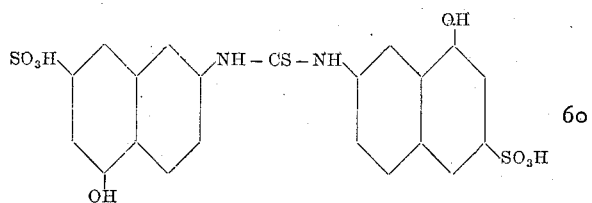

are dissolved in about four hundred parts of hot water. After the addition of from nine to ten parts of a twenty-per-cent. ammonia solution and from fifty to sixty parts of carefully-pulverized lead oxid the mixture thus obtained is heated in a vessel provided with a reflux condenser by means of a water-bath with continuous stirring. After a short time the color of the lead oxid begins to grow black by the transformation into lead sulfid. The reaction is finished when the quantity of the latter no longer increases. Subsequently the reaction mixture is filtered, mixed with an excess of hydrochloric acid, and the guanidin derivative thus produced is precipitated from the filtrate by the addition of common salt, filtered off, and dried. It is then further purified by dissolving it in a sodium-carbonate solution and precipitating it again by the addition of common salt.

The new guanidin derivative having in a free state the following formula:

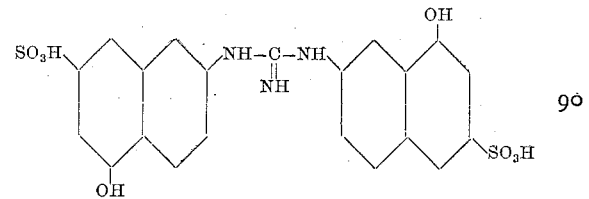

is, in the shape of the sodium salt, a grayish powder which is soluble in cold and readily soluble in hot water, soluble with difficulty in alcohol, and insoluble in ether.

The new guanidin derivative is capable of combining with one and likewise with two molecules of diazo compounds, thus furnishing valuable azo dyestuffs.

The process proceeds in an analogous manner if instead of ammonia other of the above-mentioned amins are used.

Having now described our invention and in what manner the same is to be performed, what we claim as new, and desire to secure by Letters Patent, is—

1. The process for producing new guanidin derivatives having the hereinbefore-defined general formula:

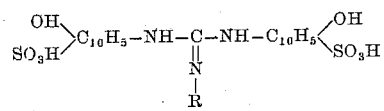

which process consists in heating the herein-defined mixed thio-urea compounds of amidonaphthol sulfonic acids with amins in the presence of agents capable of absorbing sulfureted hydrogen, and then isolating the guanidin derivatives thus produced, substantially as hereinbefore described.

2. The process for producing a new guanidin derivative having in a free state the following formula:

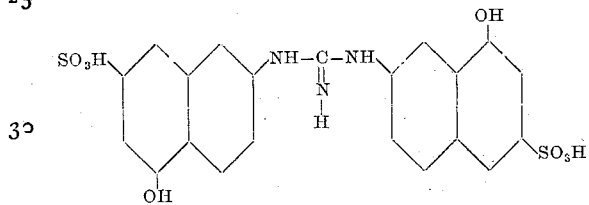

by first heating the herein-defined mixed thio-urea compound derived from $beta_1$-amido-$alpha_3$-naphthol-$beta_4$-sulfonic acid and from $beta_1$-amido-$alpha_4$-naphthol-$beta_3$-sulfonic acid with ammonia and lead oxid, and then isolating the new guanidin derivative thus produced, substantially as hereinbefore described.

3. The herein-described new mixed guanidin derivatives of amidonaphthol sulfonic acids which, in the shape of the sodium salts, are grayish powders readily soluble in hot and soluble in cold water, being soluble with difficulty in dilute mineral acids and being capable of combining with diazo compounds, valuable azo dyestuffs being thus produced, substantially as hereinbefore described.

4. The herein-described new mixed guanidin derivative derived from $beta_1$-amido-$alpha_3$-naphthol-$beta_4$-sulfonic acid and from $beta_1$-amido-$alpha_4$-naphthol-$beta_3$-sulfonic acid which, in the shape of the sodium salt, is a grayish powder soluble in cold and readily soluble in hot water, being soluble with difficulty in alcohol and insoluble in ether and being capable of combining with one and likewise with two molecules of diazo compounds, valuable azo dyestuffs being thus produced, substantially as hereinbefore described.

In testimony whereof we have signed our names in the presence of two subscribing witnesses.

ADOLF ISRAEL.
RICHARD KOTHE.

Witnesses:
OTTO KÖNIG,
EMIL BLOMBERG.